(12) United States Patent
Tomisawa

(10) Patent No.: US 7,292,205 B2
(45) Date of Patent: Nov. 6, 2007

(54) DISPLAY UNIT

(75) Inventor: Isao Tomisawa, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 645 days.

(21) Appl. No.: 10/752,444

(22) Filed: Jan. 7, 2004

(65) Prior Publication Data

US 2004/0183746 A1 Sep. 23, 2004

(30) Foreign Application Priority Data

Jan. 9, 2003 (JP) .......................... P2003-003686

(51) Int. Cl.
*G09G 5/00* (2006.01)
(52) U.S. Cl. ........................ 345/1.1; 345/1.2
(58) Field of Classification Search ................ 345/1.1, 345/1.2, 1.3, 2.1, 2.2, 3.1, 3.2; 359/621–625; 385/31, 33, 39
See application file for complete search history.

(56) References Cited

U.S. PATENT DOCUMENTS 6,961,045 B2 * 11/2005 Tsao ............................ 345/103

2002/0163482 A1 * 11/2002 Sullivan ........................ 345/6
2003/0001797 A1 * 1/2003 Sato et al. ..................... 345/4

FOREIGN PATENT DOCUMENTS

JP 2000-115812 A 4/2000

* cited by examiner

*Primary Examiner*—Nitin I. Patel
(74) *Attorney, Agent, or Firm*—Sughrue Mion Pllc.

(57) ABSTRACT

It is an object of the invention to provide a display unit consisting of a plurality of display devices which are substantially equivalently disposed at an appropriate interval optically or as seen from the side of the observer, even when the plurality of display devices are not disposed at the appropriate interval due to some technical restrictions.

A display unit is provided with a plurality of display devices disposed one after the other on the line of sight of the observer; and an optical distance setting device, which is disposed between two adjacent display devices among the plurality of display devices, for setting the optical distance between the two display devices to a predetermined value that is different from the optical distance when the air is filled between the two display devices.

22 Claims, 7 Drawing Sheets

DISPLAY UNIT

BACKGROUND OF THE INVENTION

1. Field of the Invention

The present invention relates to a display unit comprising a plurality of display devices disposed one after the other in a line of sight direction of the observer to provide a stereoscopic image by controlling the images displayed on the display devices.

2. Description of the Related Art

Conventionally, various types of apparatus capable of displaying a stereoscopic image have been proposed or put to practical use. For example, a liquid crystal shutter spectacle system is well known as an apparatus for displaying the stereoscopic image that is electrically rewritable. The liquid crystal shutter spectacles involve photographing an object from different directions using a camera, and synthesizing the acquired image data containing parallax information into one image signal, which is then displayed on the display unit. The observer puts on the liquid crystal shutter spectacles. For example, when in the odd field, a liquid crystal shutter for right eye is turned in the transmission state, and a liquid crystal shutter for left eye in the light shutout state. On the other hand, when in the even field, the liquid crystal shutter for left eye is turned in the transmission state, and the liquid crystal shutter for right eye in the light shut-out state At this time, a stereoscopic image is visualized by displaying an image for right eye in the odd field and an image for left eye in the even field synchronously, and viewing the images for right and left eyes containing parallax with respective eyes.

Also, there is a display unit for displaying a stereoscopic image that is discrete in the depth direction by superposing the images displayed on a plurality of display devices, the display unit having a plurality of display devices disposed one after the other on the line of sight of the observer. Also, there is another display unit that is improved to give a more natural stereoscopic sense by correcting the discrete state, in which the intensity of image displayed on each display device is varied so that an object is viewed at an intermediate position of discrete positions. For example, a display unit of intensity modulation type has been proposed in which the object images from a plurality of display devices are superposed, employing a plurality of half mirrors, so that a translucent object or a rear object is viewed transparently (e.g., refer to patent document 1).

[Patent Document 1]

Japanese Patent Laid-Open No. 2000-115812

SUMMARY OF THE INVENTION

By the way, a display unit having a plurality of display devices disposed one after the other on the line of sight of the observer has an appropriate interval between the plurality of display devices to display the stereoscopic image.

However, when the plurality of display devices are disposed on the basis of the appropriate interval, there are some restrictions on the unit specifications to impede the realization of the display unit. Or when the plurality of display devices are disposed on the basis of the appropriate interval, it is often difficult or impossible to meet those restrictions. For example, when the appropriate interval is longer, the volume of the display unit is increased. Therefore, there is an inconvenience that it is technically difficult to reduce the display unit in size in consideration of thin conformation or portability. On the other hand, when the appropriate interval is shorter, it is necessary to place the plurality of display devices in proximity. However, there is another technical inconvenience that the plurality of display devices can not be disposed at a shorter interval in some cases due to the projection such as a fixing screw, for example.

The present invention has been achieved in the light of the above-mentioned inconveniences, and it is an object of the invention to provide a display unit consisting of a plurality of display devices which are substantially equivalently disposed at an appropriate interval optically or as seen from the side of the observer, even when the plurality of display devices are not disposed at the appropriate interval due to some technical restrictions.

The above object of the present invention can be achieved by a display unit of the present invention. The display unit is provided with a plurality of display devices disposed one after the other on the line of sight of the observer; and an optical distance setting device, which is disposed between two adjacent display devices among the plurality of display devices, for setting the optical distance between the two display devices to a predetermined value that is different from the optical distance when the air is filled between the two display devices.

According to the present invention, in operation, a display unit displays a stereoscopic or three-dimensional image by superposing the images on a plurality of display devices disposed one after the other on the line of sight of the observer to make the stereoscopic vision as seen from the side of the observer.

In one aspect of the present invention can be achieved by the display unit of the present invention. The display unit is wherein the optical distance setting device comprises a transparent member having a predetermined refractive index.

According to the present invention, the optical distance between two display devices can be changed by passing light through the transparent member having a larger refractive index than the air, while the interval between two display devices is actually fixed.

In another aspect of the present invention can be achieved by the display unit of the present invention. The display unit is wherein the transparent member is composed of at least one of glass and resin having a higher refractive index than the air.

According to the present invention, the optical path length calculated in the air between two display devices is relatively shortened with relative easy by passing light through the transparent member containing glass or resin having a higher refractive index than the air.

In further aspect of the present invention can be achieved by the display unit of the present invention. The display unit is wherein the optical distance setting device is provided with a reflecting member for making the optical path length between the two display devices longer than the optical path length when the air is filled by folding and lengthening the optical path between the two display devices.

According to the present invention, the optical path length is longer than the interval between two display devices in which the air is simply filled without intervention of the reflecting member, whereby the observer recognizes as if the display device disposed in the rear of the reflecting member was disposed further in the rear by the amount of longer optical path. That is, the apparent depth of the backward image field as seen from the observer is lengthened.

In further aspect of the present invention can be achieved by the display unit of the present invention. The display unit is wherein the reflecting member is provided corresponding to each pixel or each pixel block or pixel line composed of plural pixels in the two display devices, in which the reflecting member folds the optical path so that the images displayed at the pixel or the pixel block or pixel line in the two display devices correspond.

According to the present invention, the display content of image such as lightness is at the same level in pixel unit, whereby the appropriate image is also displayed by reflection of the reflecting member. Thereby, it is possible to view the stereoscopic image that is appropriately unified as a whole.

The above object of the present invention can be achieved by a display unit of the present invention. The display unit is provided with a plurality of display devices disposed one after the other on the line of sight of the observer; and an image-forming device, which is disposed between two adjacent display devices among the plurality of display devices, for forming an image displayed on a display device disposed in the rear as seen from the side of the observer among the two display devices at a different position from the position of the display device disposed in the rear.

According to the present invention, even when the plurality of display devices are not disposed at appropriate interval due to some technical restrictions, the plurality of display devices are substantially equivalently disposed at appropriate interval optically or as seen from the side of the observer.

In one aspect of the present invention can be achieved by the display unit of the present invention. The display unit is wherein the image-forming device comprises a lens.

According to the present invention, the image displayed on the display device disposed in the rear of the lens among two display devices is formed at a different position from the position of display device disposed in the rear in accordance with the focal distance of the lens. That is, if the focal distance of the lens is set at a predetermined value, it is possible to make the apparent depth of the backward image field longer or shorter relatively easily.

In another aspect of the present invention can be achieved by the display unit of the present invention. The display unit is wherein the lens comprises a convex lens.

According to the present invention, by using a convex lens disposed between two display devices, the image displayed on the display device disposed in the rear of the convex lens among two display devices is formed in the rear of the position of the display device disposed in the rear.

In further aspect of the present invention can be achieved by the display unit of the present invention. The display unit is wherein the lens comprises a concave lens.

According to the present invention, by using a concave lens disposed between two display devices, the image displayed on the display device disposed in the rear of the concave lens among two display devices is formed in the fore of the position of the display device disposed in the rear.

In further aspect of the present invention can be achieved by the display unit of the present invention. The display unit is wherein the lens comprises a Fresnel lens.

According to the present invention, the thickness of the lens is made smaller using a Fresnel lens. Thereby, the device is reduced in the size, and the thin conformation or portability is promoted.

In further aspect of the present invention can be achieved by the display unit of the present invention. The display unit is wherein the lens comprises a micro-lens array.

According to the present invention, the thickness of the lens is made smaller using a micro-lens array, and a variation in the magnification of the image formed is reduced.

In further aspect of the present invention can be achieved by the display unit of the present invention. The display unit is wherein the lens corresponds to each pixel or each pixel block or pixel line composed of plural pixels in the plurality of display devices.

According to the present invention, one lens corresponds to each pixel or each pixel block or pixel line of the plurality of display devices. Therefore, the luminosity or degree of image formation is at the same level for all the pixels, whereby it is possible to display the stereoscopic image that is unified as a whole. Moreover, the constitution of lens array is simplified by employing the lens array in which one lens corresponds to each pixel block or pixel line.

In further aspect of the present invention can be achieved by the display unit of the present invention. The display unit is wherein the screen of each of one or more display devices disposed in the rear of the image-forming device as seen from the side of the observer among the plurality of display devices and the screen of each of one or more display devices disposed in the fore of the image-forming device as seen from the side of the observer among the plurality of display devices have different sizes.

According to the present invention, the image displayed on one or more display devices disposed in the rear of the lens as seen from the side of the observer among the plurality of display devices is enlarged or reduced via the lens. However, in this embodiment, the images are naturally superposed in consideration of this enlargement or reduction. That is, the observer views the images displayed on the plurality of display devices at the same or almost same magnitude and thus recognizes the superposed image.

In further aspect of the present invention can be achieved by the display unit of the present invention. The display unit is wherein the screens have different sizes so that each pixel or each pixel block or pixel line composed of plural pixels in the plurality of display devices have the same size between the display device disposed in the rear and the display device disposed in the fore as seen from the side of the observer and be superposed.

According to the present invention, even though the images are enlarged or reduced and superposed by the lens disposed between two display devices, the images are superposed in consideration of the enlargement or reduction, whereby it is possible to view the excellent image as seen from the observer.

In further aspect of the present invention can be achieved by the display unit of the present invention. The display unit is wherein the optical distance setting device is intimately contact with at least one of the two display devices.

According to the present invention, even if the optical distance setting device is contact with at least one of two display devices, two display devices can be disposed at a shorter or longer interval optically or as seen from the side of the observer than the actual interval between two display devices. In this case, the optical distance setting device may be contact with one or both of the two display devices.

In further aspect of the present invention can be achieved by the display unit of the present invention. The display unit is wherein the image-forming device is intimately contacted with at least one of the two display devices.

According to the present invention, even if the image-forming device is contact with at least one of two display devices, two display devices can be disposed at a shorter or longer interval optically or as seen from the side of the observer than the actual interval between two display devices. In this case, the image-forming device may be contact with only one or both of the two display devices.

In further aspect of the present invention can be achieved by the display unit of the present invention. The display unit is wherein the display devices are translucent at least except for the display device farthest away from the observer among the plurality of display devices.

According to the present invention, the image displayed on the display device disposed in the rear is viewed through the display device disposed in the fore as seen from the observer, and the display device is directly disposed on the line of sight of the observer.

In further aspect of the present invention can be achieved by the display unit of the present invention. The display unit is wherein the translucent display device is a liquid crystal display device or EL (Electro-Luminescence) display device.

According to the present invention, the stereoscopic image is displayed, employing a translucent panel-like display device such as an EL display device.

In further aspect of the present invention can be achieved by the display unit of the present invention. The display unit is wherein the plurality of display devices is provided with a display device synthesized of a half mirror.

According to the present invention, the display device without light transmittance may be employed as the display device, for example, a cathode ray tube display device and a plasma display device.

DETAILED DESCRIPTION OF THE PREFERRED EMBODIMENTS

The preferred embodiments of the present invention are described below.

A display unit concerning a first embodiment of the invention is provided with a plurality of display devices disposed one after the other on the line of sight of the observer; and an optical distance setting device, which is disposed between two adjacent display devices among the plurality of display devices, for setting the optical distance between the two display devices to a predetermined value that is different from the optical distance when the air is filled between the two display devices.

According to a first embodiment of the invention, in operation, a display unit displays a stereoscopic or three-dimensional image by superposing the images on a plurality of display devices disposed one after the other on the line of sight of the observer to make the stereoscopic vision as seen from the side of the observer. That is, the observer can view a stereoscopic image. For example, for a stereoscopic display of intensity modulation type, the same image portion displayed by two adjacent display devices (hereinafter adequately referred to as "two display devices") is allocated intensity, so that an image appears to exist at a depth position between two display devices, thereby allowing the continuous stereoscopic display. Or the image portion may be displayed on either of two display devices to enable the discrete stereoscopic display. Moreover, the continuous or discrete stereoscopic display is enabled in which an image appears to exist at any one position across three or more display devices.

Particularly in this embodiment, an optical distance setting device is disposed between two display devices, and the optical distance between two display devices is set to a predetermined value that is different from the optical distance when the air is filled between two display devices. The term "optical distance" as herein used is the distance optically calculated, or the apparent distance as seen from the side of the observer. And the observer views an image field on a display device located in the rear (back) among two display devices with reference to the observer (hereinafter appropriately referred to as a "backward image field") via the optical distance setting device.

Accordingly, the observer views the image via the optical distance setting device, and recognizes the image field (i.e., backward image field) at a different position (i.e., an apparent depth position) from the position at which the display device is actually disposed. Accordingly, the interval between two display devices can be different from the actual interval optically or as seen from the side of the observer.

Thereby, while two display devices are substantially equivalently disposed at appropriate interval as seen optically in making the stereoscopic display, two display devices can be disposed actually at a shorter or longer interval than the interval between two display devices appropriately disposed in the air. In other words, for example, even when a plurality of display devices are not disposed at appropriate interval due to some technical restrictions, the plurality of display devices are substantially equivalently disposed at appropriate interval optically or as seen from the side of the observer.

In the display unit having three or more display devices, three or more display devices are substantially equivalently disposed at appropriate interval by taking into consideration all the optical lengths calculated in the air between the adjacent display devices.

According to a display unit concerning a first embodiment of the invention, the optical distance setting device includes a transparent member having a predetermined refractive index.

In this embodiment, the optical distance setting device comprises a transparent member having a predetermined refractive index, for example, made of glass, whereby the optical distance can be set at a predetermined value by passing light through the transparent member. Accordingly, the optical distance between two display devices can be changed by passing light through the transparent member having a larger refractive index than the air, while the interval between two display devices is actually fixed. In this case, the optical path length calculated in the air from the observer to the backward image field is the depth (or apparent depth) of the backward image field as seen from the observer. The term "optical path length calculated in the air" as used herein is the imaginary optical path length in which the optical path length is calculated in the air by replacing the optical distance setting device with the air. Assuming that this value is LA, LA is represented by L/n. Where L is the thickness of the optical distance setting device, and coincides with the optical path length between two display devices (i.e., actual interval between two display devices) when the optical distance setting device is filled between two display devices. Also, n is the refractive index of the material or medium making up the optical distance setting device.

Accordingly, it is possible to lengthen the actual interval between two display devices by shortening relatively the optical path length (i.e., apparent depth) calculated in the air. Conversely, it is possible to shorten the actual interval between two display devices by passing light through the member or medium having a smaller refractive index than the air or through the vacuum to lengthen the optical path length (i.e., apparent depth) calculated in the air, while the actual interval between two display devices is fixed.

For example, if the optical path length (LA=L/n) calculated in the air is set to be relatively longer by making the refractive index n between two display devices is lower than in the air, and the actual interval between two display devices is shorter, the unit is reduced in size, and the thin conformation or portability is promoted. Conversely, if the optical path length (LA=L/n) calculated in the air is set to be relatively shorter by making the refractive index n between two display devices higher than in the air, and the actual interval between two display devices is lengthened, the display device or display unit can be constituted in the size not to interfere with a projection such as a fixing screw, if any.

In this embodiment, the transparent member includes at least one of glass and resin having a higher refractive index than the air.

With this constitution, the optical path length calculated in the air between two display devices is relatively shortened relatively easily by passing light through the transparent member containing glass or resin having a higher refractive index than the air.

A display unit concerning a first embodiment of the invention, the optical distance setting device includes a reflecting member for making the optical path length between the two display devices longer than the optical path length when the air is filled by folding and lengthening the optical path between the two display devices.

In this embodiment, an image displayed on the display device disposed in the rear of the reflecting member comprising the reflecting mirror as seen from the side of the observer among two display devices is reflected by the reflecting member, and passed through the optical path lengthened by folding, after which the observer views the image through the longer optical path. For example, the image is reflected by the reflecting member, so that the optical path of the image is changed in a direction that is different from the line of sight of the observer, and ahead of its changed optical path, further changed by another reflecting member in the same direction as the line of sight of the observer to allow light to proceed to the side of the observer. Accordingly, the optical path length is longer by the length of optical path changed by reflection as compared with when the image is not reflected by the reflecting member, namely, when the optical path is linear. That is, the optical path length can be longer than the interval between two display devices in which the air is simply filled without intervention of the reflecting member, whereby the observer recognizes as if the display device disposed in the rear of the reflecting member was disposed further in the rear by the amount of longer optical path. That is, the apparent depth of the backward image field as seen from the observer is lengthened.

The reflecting member is not limited to the reflecting mirror, but may be a predetermined member capable of reflecting light appropriately to achieve the same effect.

Thereby, the optical path length calculated in the air between two display devices is made relatively longer, so that the actual length between two display devices is shortened.

The reflection of the reflecting member is not limited to two reflections as described above, but may be even reflections, in which the optical path is changed by the reflecting member at the last stage to allow light to proceed to the side of the observer along the line of sight of the observer. That is, owing to the even reflections, there is no need for considering the reversion of the image by total reflection. Also, if the optical path is along the line of sight of the observer by the final reflection to allow light to proceed to the side of the observer, the observer can directly view the image displayed on two display devices. However, even with odd reflections, if the image displayed on the display device is reversed in advance and displayed, the optical distance setting device employing the above reflecting member may be constituted.

The reflecting member is provided corresponding to each pixel or each pixel block or pixel line composed of plural pixels in the two display devices, in which the reflecting member folds the optical path so that the images displayed at the pixel or the pixel block or pixel line in the two display devices correspond.

With the above constitution, one reflecting member corresponds to each pixel or each pixel block or pixel line in two display devices. Therefore, the image (i.e., emitted light) displayed at each pixel or each pixel block or pixel line on the display device disposed in the rear as seen from the side of the observer among two display devices is superposed and displayed on the image displayed at each pixel or each pixel block or pixel line on the display device disposed in the fore as seen from the side of the observer among two display devices on the line of sight of the observer. Accordingly, even if the optical path length is lengthened by the reflecting member, the observer can view the stereoscopic image by appropriately superposing the two images. In addition, the display content of image such as lightness is at the same level in pixel unit, whereby the appropriate image is also displayed by reflection of the reflecting member. Thereby, it is possible to view the stereoscopic image that is appropriately unified as a whole.

A display unit concerning a second embodiment of the present invention is provided with a plurality of display devices disposed one after the other on the line of sight of the observer; and an image-forming device, which is disposed between two adjacent display devices among the plurality of display devices, for forming an image displayed on a display device disposed in the rear as seen from the side of the observer among the two display devices at a different position from the position of the display device disposed in the rear.

According to a second embodiment of the invention, in operation, a display unit displays a stereoscopic or three-dimensional image by superposing the images on a plurality of display devices disposed one after the other on the line of sight of the observer to make the stereoscopic vision as seen from the side of the observer. For example, for a stereoscopic display of intensity modulation type, the same image portion displayed by two adjacent display devices is allocated intensity, so that an image appears to exist at a depth position between two display devices, thereby allowing the continuous stereoscopic display. Or the image portion may be displayed on either of two display devices to enable the discrete stereoscopic display. Moreover, the continuous or discrete stereoscopic display is enabled in which an image appears to exist at any one position across three or more display devices.

Particularly in this embodiment, an image-forming device is disposed between two display devices, whereby the image (i.e., backward image field) displayed on the display device disposed in the rear of the image-forming device as seen from the side of the observer is formed in front of or behind the display device disposed in the rear. Accordingly, the observer views the image displayed on the display device via the image-forming device and thus recognizes the image field formed at a different position from the actual position of the display device. That is, the apparent depth of the backward image field as seen from the side of the observer can be longer or shorter.

Thereby, while the plurality of display devices are substantially equivalently disposed at appropriate interval as optically seen in making the stereoscopic display, namely, the interval between two display devices is made equivalent to that when no image-forming device is disposed between two display devices by employing the image-forming device, two display devices are disposed at a shorter or longer interval than the actual interval between two display devices when no image-forming device is disposed. In other words, for example, even when the plurality of display devices are not disposed at appropriate interval due to some technical restrictions, the plurality of display devices are substantially equivalently disposed at appropriate interval optically or as seen from the side of the observer.

For example, if the backward image field is formed further backward by the image-forming device to lengthen the apparent depth of the backward image field as seen from the side of the observer, the actual interval or device size is relatively reduced. Therefore, the total size of the device is reduced, and the thin conformation or portability is promoted. Conversely, if the backward image field is formed further forward (i.e., on the fore side as seen from the observer) to shorten the apparent depth of the backward image field, the actual interval or device size is relatively increased. Therefore, it is possible to construct the display unit having the plurality of display devices disposed in a desired size while meeting the structural restrictions due to the projection such as fixing screw.

In the display unit having three or more display devices, three or more display devices are substantially equivalently disposed at appropriate interval by taking into consideration the apparent depth of the image displayed on each of one or more display devices disposed in the rear of the image-forming device among three or more display devices.

In one embodiment of the display unit, the image-forming device includes a lens.

With this constitution, the image displayed on the display device disposed in the rear of the lens among two display devices is formed at a different position from the position of display device disposed in the rear in accordance with the focal distance of the lens. That is, if the focal distance of the lens is set at a predetermined value, it is possible to make the apparent depth of the backward image field longer or shorter relatively easily.

In one embodiment of the display unit, the lens comprises a convex lens.

With this constitution, using a convex lens disposed between two display devices, the image displayed on the display device disposed in the rear of the convex lens among two display devices is formed in the rear of the position of the display device disposed in the rear. Or the image displayed on the display device disposed in the rear of the convex lens among two display devices is formed in the fore of the position of the display device disposed in the rear. That is, it is possible to make the apparent depth of the backward image field as seen from the observer longer or shorter relatively easily. In one embodiment of the display unit, the lens includes a concave lens.

With this constitution, using a concave lens disposed between two display devices, the image displayed on the display device disposed in the rear of the concave lens among two display devices is formed in the fore of the position of the display device disposed in the rear. That is, it is possible to make the apparent depth of the backward image field as seen from the observer shorter relatively easily.

In a display unit of an embodiment, the lens includes a Fresnel lens.

With this constitution, the thickness of the lens is made smaller using a Fresnel lens. Thereby, the device is reduced in the size, and the thin conformation or portability is promoted.

In a display unit of an embodiment, the lens includes a micro-lens array.

With this constitution, the thickness of the lens is made smaller using a micro-lens array, and a variation in the magnification of the image formed is reduced.

Moreover, in the embodiment of the display unit having the image-forming device comprising various kinds of lens, it is possible to select the optimal or preferable embodiment of lens on the basis of the use embodiment or condition of the display unit.

Also, the lens may be a focus variable lens, an aspherical lens or a distributed refractive index lens, rather than the convex lens, the concave lens, the Fresnel lens, and the micro-lens array.

In an embodiment of the display unit concerning a second embodiment of the present invention, the lens corresponds to each pixel or each pixel block or pixel line composed of plural pixels in the plurality of display devices.

With the above constitution, one lens corresponds to each pixel or each pixel block or pixel line of the plurality of display devices. Therefore, the luminosity or degree of image formation is at the same level for all the pixels, whereby it is possible to display the stereoscopic image that is unified as a whole. Moreover, the constitution of lens array is simplified by employing the lens array in which one lens corresponds to each pixel block or pixel line.

In an other embodiment of the display unit concerning a second embodiment of the present invention, the screen of each of one or more display devices disposed in the rear of the image-forming device as seen from the side of the observer among the plurality of display devices and the screen of each of one or more display devices disposed in the fore of the image-forming device as seen from the side of the observer among the plurality of display devices have different sizes.

When the image-forming device comprises the lens as above, the image displayed on one or more display devices disposed in the rear of the lens as seen from the side of the observer among the plurality of display devices is enlarged or reduced via the lens. However, in this embodiment, the images are naturally superposed in consideration of this enlargement or reduction. That is, the observer views the images displayed on the plurality of display devices at the same or almost same magnitude and thus recognizes the superposed image.

Also, it may be possible to reduce or enlarge beforehand the image displayed on each of one or more display devices disposed in the rear, instead of or in addition to reducing or enlarging beforehand the screen of one or more display devices disposed in the rear.

However, even if the display device disposed in the rear and the display device disposed in the fore are of the equal size, or the image displayed on the display device disposed in the rear is not reduced or enlarged beforehand, the images displayed on two display devices are superposed to the extent that the observer can view the stereoscopic image.

The screens have different sizes or same sizes so that each pixel or each pixel block or pixel line composed of plural pixels in the plurality of display devices may have the same size between the display device disposed in the rear and the display device disposed in the fore as seen from the side of the observer and be superposed.

In the display unit in which the display device disposed in the rear and the display device disposed in the fore have different sizes as described above, the screens may be different sizes so far as each pixel or each pixel block or pixel line composed of plural pixels in the plurality of display devices has the same size between the display device disposed in the rear and the display device disposed in the fore as seen from the side of the observer and be superposed.

With this constitution, even though the images are enlarged or reduced and superposed by the lens disposed between two display devices, the images are superposed in consideration of the enlargement or reduction, whereby it is possible to view the excellent image as seen from the observer. The term "same size" as used herein means literally the same size, as well as the substantially same size to the extent that plural images of the same object superposed appear the same size visually for the observer.

In other embodiment of the display unit concerning a second embodiment of the present invention, the optical distance setting device is intimately contact with at least one of the two display devices.

In this embodiment, even if the optical distance setting device is contact with at least one of two display devices, two display devices can be disposed at a shorter or longer interval optically or as seen from the side of the observer than the actual interval between two display devices. In this case, the optical distance setting device may be contact with one or both of the two display devices.

Even if the optical distance setting device is not contact with at least one of two display devices, the plurality of display devices can be disposed at a shorter or longer interval optically or as seen from the side of the observer than the actual interval between two display devices.

In other embodiment of the display unit concerning a second embodiment of the present invention, the image-forming device is intimately contacted with at least one of the two display devices.

In this embodiment, even if the image-forming device is contact with at least one of two display devices, two display devices can be disposed at a shorter or longer interval optically or as seen from the side of the observer than the actual interval between two display devices. In this case, the image-forming device may be contact with only one or both of the two display devices.

Even if the image-forming device is not contact with at least one of two display devices, the plurality of display devices can be disposed at a shorter or longer interval optically or as seen from the side of the observer than the actual interval between two display devices.

In other embodiment of the display unit concerning a first embodiment and a second embodiment of the present invention, the display devices are translucent at least except for the display device farthest away from the observer among the plurality of display devices.

In this embodiment, the image displayed on the display device disposed in the rear is viewed through the display device disposed in the fore as seen from the observer, and the display device is directly disposed on the line of sight of the observer.

In other embodiment of the display unit concerning a first embodiment and a second embodiment of the present invention, the translucent display device is a liquid crystal display device or EL (Electro-Luminescence) display device.

With this constitution, the stereoscopic image is displayed, employing a translucent panel-like display device such as a liquid crystal display device or an EL display device.

In other embodiment of the display unit concerning a first embodiment and a second embodiment of the present invention, the plurality of display devices comprise a display device synthesized of a half mirror.

In this embodiment, the plurality of display devices is not directly disposed on the line of sight of the observer, and the images are synthesized via the half-mirror. Accordingly, the display device without light transmittance may be employed as the display device, for example, a cathode ray tube display device and a plasma display device.

As described above, with the display device according to the embodiment of the invention, the plurality of display devices and the optical distance setting device or image-forming device may be provided. Therefore, the interval between two display devices can be different from the actual interval optically or as seen from the side of the observer. That is, the plurality of display devices are substantially equivalently disposed at an appropriate interval optically or as seen from the side of the observer, even when the plurality of display devices can not be disposed at the appropriate interval due to some technical restrictions. Also, with the embodiment of the invention, the same effect can be attained whether the moving picture or still image.

This action and other benefits of this embodiment will be further clear from the following description.

EXAMPLES

A display unit of the present invention will be described below by way of example with reference to the accompanying drawings.

(Operation Principle and Basic Constitution of Display Device)

Figure 1:
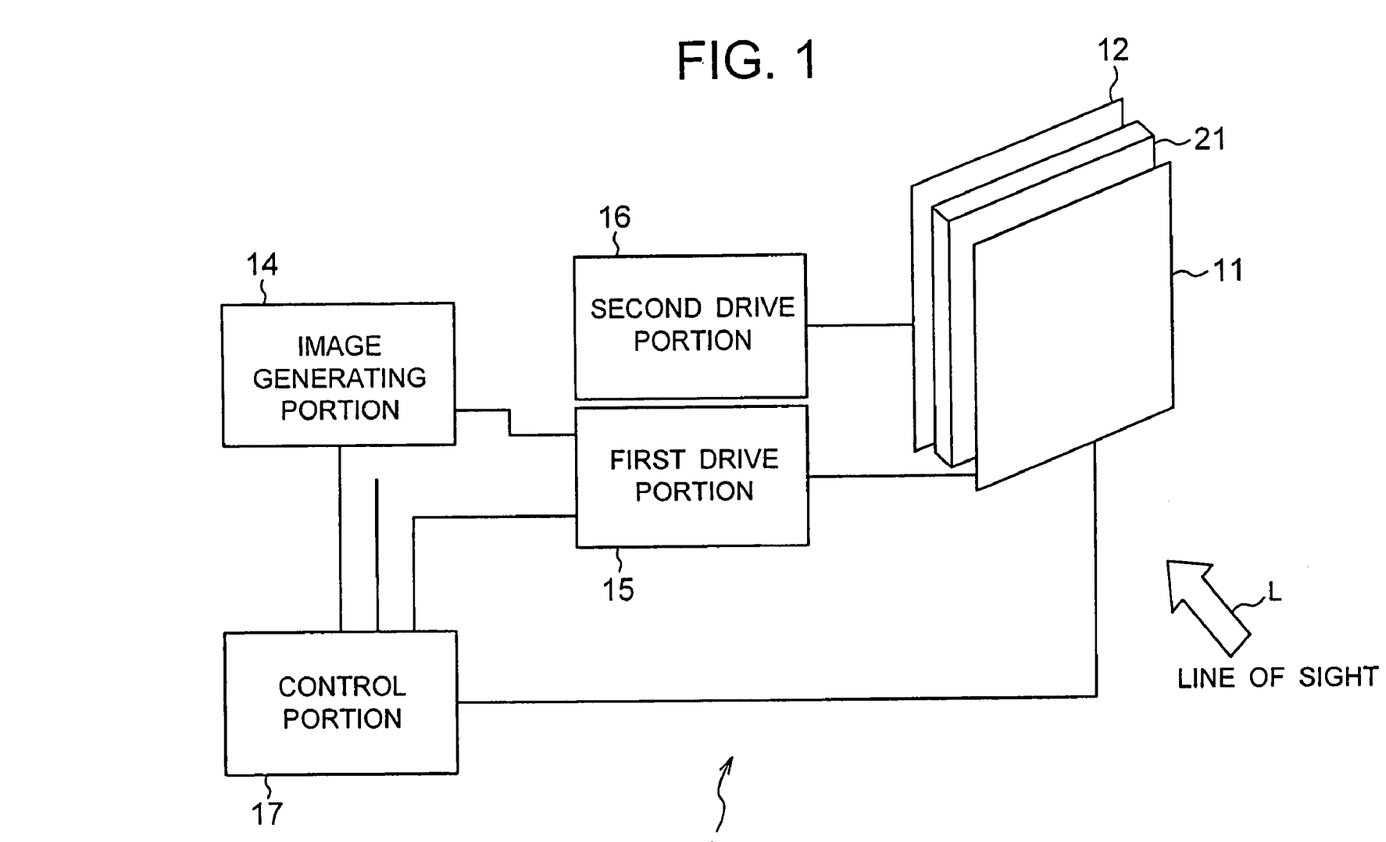
FIG. 1 is a block diagram showing the constitution of a display unit according to an embodiment of the present invention.
Figure 2:
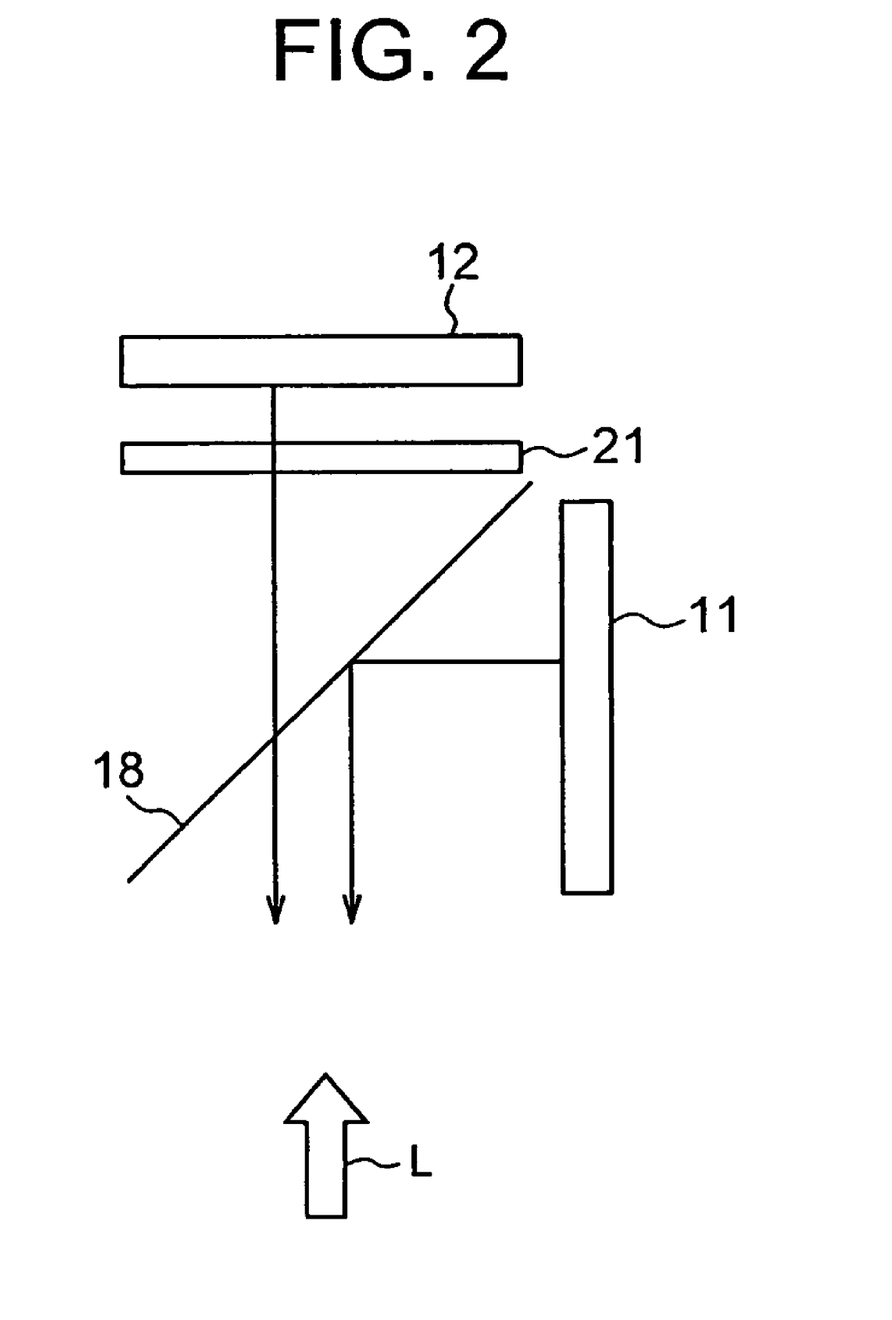
FIG. 2 is a schematic cross-sectional view showing one embodiment of an image display portion of the display unit according to the embodiment of the invention.

Referring to FIG. 1 and FIG. 2, the operation principle and basic constitution of a display unit according to an embodiment of the invention will be described below. FIG.

1 is a block diagram showing the constitution of the display unit according to the embodiment of the invention. FIG. 2 is a schematic cross-sectional view showing one embodiment of a display portion of the display unit.

As shown in FIG. 1, the display unit 1 comprises a front screen 11, a back screen 12 disposed in the rear of the front screen 11, an image generating portion 14 for generating an image displayed on the front screen 11 and the back screen 12, a first drive portion 15 for displaying an image signal from the image generating portion 14 on the front screen 11, a second drive portion 16 for displaying an image signal from the image generating portion 14 on the back screen 12, an optical distance setting portion 21 disposed between the front screen 11 and the rear screen 12, and a control portion 17 for controlling the entire display unit.

The front screen 11 and the back screen 12 forms an image display portion of the display unit 1, and are disposed one after the other with a certain gap on the line of sight L of the observer. The front screen 11 is disposed in the fore, and the back screen 12 is disposed in the rear. For the front screen 11, the light transmissive display unit such as a liquid crystal display device or an EL display device is employed to allow the user to view the image on the back screen 12 in the rear transparently. Also, the back screen 12 disposed in the rear may be a liquid crystal display device or EL display device, or a cathode ray tube display device or plasma display device owing to no necessity of light transmittance. The front screen 11 and the back screen 12 may have the same size or different sizes.

The image is displayed on each of the front screen 11 and the back screen 12, whereby the observer recognizes the discrete stereoscopic image. Moreover, by increasing or decreasing its intensity, the stereoscopic image may be displayed as if the image appears between the front screen 11 and the back screen 12.

The front screen 11 may be constituted of a cathode ray tube display device or plasma display device without having light transmittance rather than the liquid crystal display device or EL display device. That is, the front screen 11 is disposed before the back screen 12 not to intercept the line of sight L, with the half-mirror 18 provided on the line of sight of the observer, in which the angle of the half-mirror 18 is determined so that the image displayed on the front screen 11 is superposed on the image displayed on the back screen 12, as shown in FIG. 2. Thereby, the display unit without light transmittance is introduced into the front screen 11.

Referring to FIG. 1 again, the image generating portion 14 generates the images displayed on the front screen 11 and the back screen 12 and stores them. Also, the image input from the outside, for example, the image created on the personal computer, may be recorded in a predetermined recording area, and read, as needed. The images of unit are managed individually, and required to display independently. Which the image is displayed on the front screen 11 or the back screen 12 individually depends on the display position, size, luminosity, hue, display form, and image deformation.

The first drive portion 15 and the second drive portion 16 drive the display on the front screen 11 and the back screen 12 on the basis of an image signal for the front screen 11 or the back screen 12 formed by the image generating portion 14. A function for ornamentally and effectively driving the display with the display timing or flashing under the control of the control portion 17 may be provided.

In this embodiment, particularly, the optical distance setting portion 21 sets the optical distance between the front screen 11 and the back screen 12 at a predetermined value that is different from the optical distance when the air is filled between both screens, whereby the image field (i.e., backward image field) of the image displayed on the back screen 12 is reflected forward or backward of the actual position on the back screen 12.

The optical distance setting portion 21 may form the image displayed on the back screen 12 at a different position from the actual position on the back screen 12, whereby the image field of the image displayed on the back screen 12 is reflected in the fore or rear of the actual position on the back screen 12.

The control portion 17 performs the overall control of the display unit 1. The control portion 17 produces the image signals for displaying on the image generating portion 14 by setting the display forms such as intensity and size of the front screen 11 and the back screen 12 in displaying the stereoscopic image. Additionally, the control portion 17 controls the operation of the first drive portion 15 and the second drive portion 16.

(Principle of the Optical Distance Setting Portion for Setting the Optical Distance)

Figure 3A:
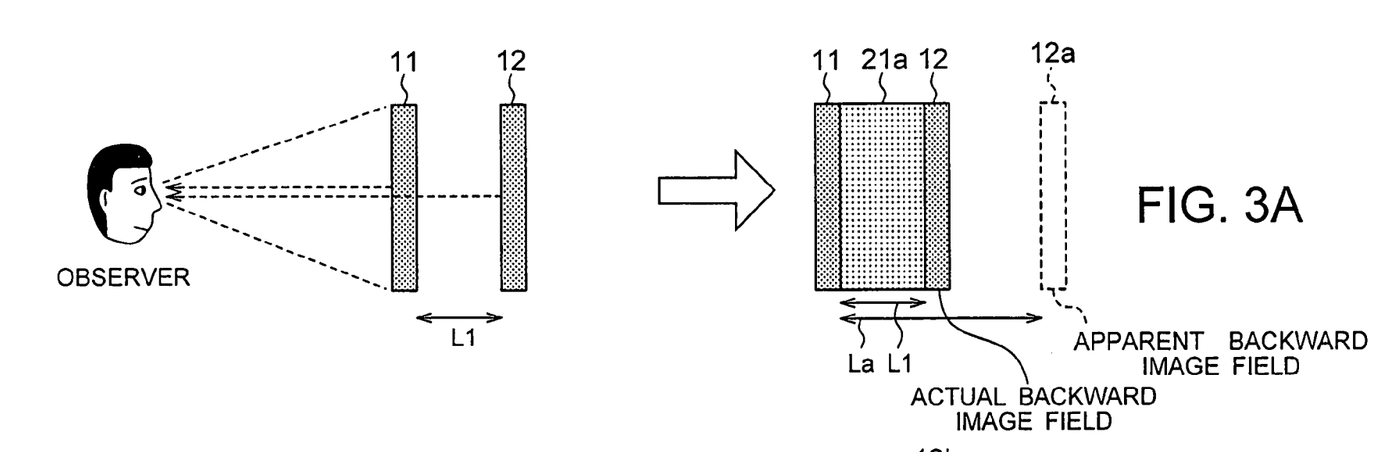
FIGS. 3A and 3B are conceptual views showing the constitution of the image display portion and an optical distance setting portion according to the embodiment of the invention.
Figure 3B:
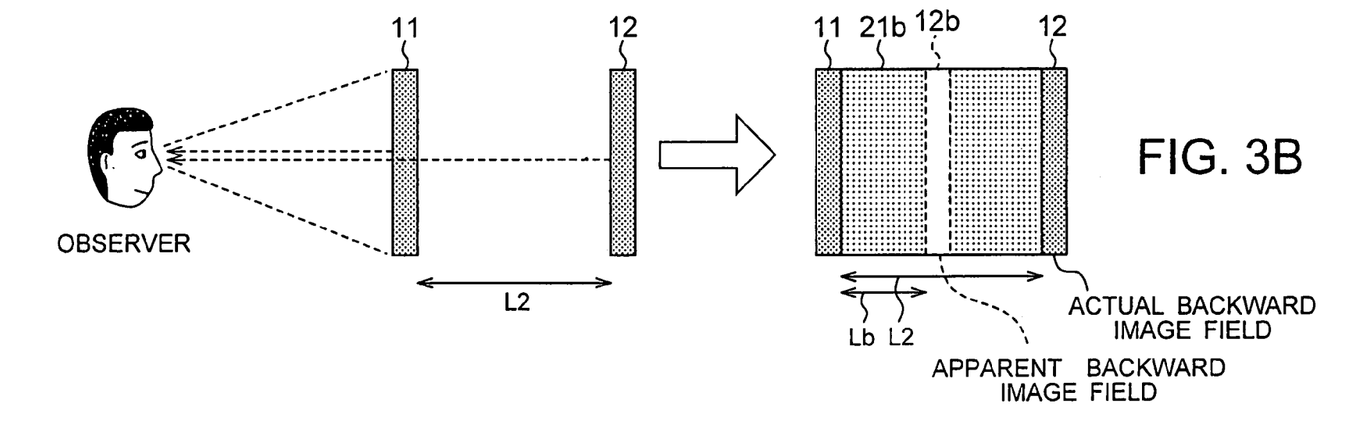

Referring to FIG. 3, a principle for setting the optical distance by the optical distance setting portion provided for the display unit according to the embodiment of the invention will be described below. Herein, FIG. 3A shows schematically the principle for lengthening the apparent depth of the backward image field employing the optical distance setting portion in this embodiment, and FIG. 3B shows schematically the principle for shortening the apparent depth of the backward image field employing the optical distance setting portion in this embodiment.

As shown in FIG. 3A, the display unit 1 according to the embodiment of the invention comprises the front screen 11 and the back screen 12 disposed a distance L1 apart, in which the optical distance setting portion 21a containing a transparent member having the refractive index n1 ($\leq 1$) that is smaller than the refractive index of the air is disposed in contact between the front screen 11 and the back screen 12. Where n1 is the refractive index of the optical distance setting portion 21a relative to the air.

Since the optical distance setting portion 21a contains the transparent member having the refractive index smaller than the refractive index of the air, the optical distance (i.e., optical path length calculated in the air) when the optical distance setting portion 21a is replaced with the air is relatively longer. That is, the optical path length calculated in the air from the observer to the backward image field is relatively longer, whereby the apparent depth of the backward image field as seen from the observer is longer. Herein, the optical path length La calculated in the air is indicated by La=L1/n1. Accordingly, the apparent backward image field 12a is reflected at a position distance La apart from the front screen 11 rearward of the actual position of the backward image field on the back screen 12 as seen from the side of the observer, whereby the observer recognizes as if the back screen 12 was disposed at the position of the apparent backward image screen 12a. Accordingly, the front screen 11 and the back screen 12 are disposed actually with interval L1, but disposed with a longer interval La than interval L1 optically or as seen from the side of the observer, whereby the substantially equivalent state is realized.

As shown in FIG. 3B, the display unit 1 according to the embodiment of the invention comprises the front screen 11 and the back screen 12 disposed distance L2 apart, in which the optical distance setting portion 21b containing the transparent member, for example, glass or resin, having the refractive index n2 ($\geq 1$) that is larger than the refractive index of the air is disposed in contact with the front screen 11 and the back screen 12. Where n2 is the refractive index of the optical distance setting portion 21b relative to the air.

Since the optical distance setting portion 21b contains the transparent member having the refractive index larger than the refractive index of the air, the optical distance (i.e., optical path length calculated in the air) when the optical distance setting portion 21b is replaced with the air is relatively shorter. That is, the optical path length calculated in the air from the observer to the backward image field is relatively shorter, whereby the apparent depth of the backward image field as seen from the observer is shorter. Herein, the optical path length Lb calculated in the air is indicated by Lb=L2/n2. Accordingly, the apparent backward image field 12b is reflected at a position distance Lb apart from the front screen 11 forward of the actual position of the backward image field on the back screen 12 as seen from the side of the observer, whereby the observer recognizes as if the back screen 12 was disposed at the position of the apparent backward image screen 12b. Accordingly, the front screen 11 and the back screen 12 are disposed actually with interval L2, but disposed with a shorter interval Lb than interval L2 optically or as seen from the side of the observer, whereby the substantially equivalent state is realized.

The optical distance setting portion 21a or the optical distance setting portion 21b are not contact with both the front screen 11 and the back screen 12, but may be contact with at least one of the front screen 11 and the back screen 12, or never contact with the front screen 11 and the back screen 12.

As will be clear from the above description, if the apparent depth of the backward image field is longer, the actual interval or device size is relatively smaller. Therefore, the entire device is reduced in size, and the thin conformation or portability is promoted. Conversely, if the apparent depth of the backward image field is shorter, the actual interval or device size is relatively larger. Therefore, it is possible to construct the display unit consisting of the plurality of display devices disposed in a desired size while meeting the structural restrictions with the projection such as fixing screw.

(Specific Examples of Optical Distance Setting Portion)

Figure 4:
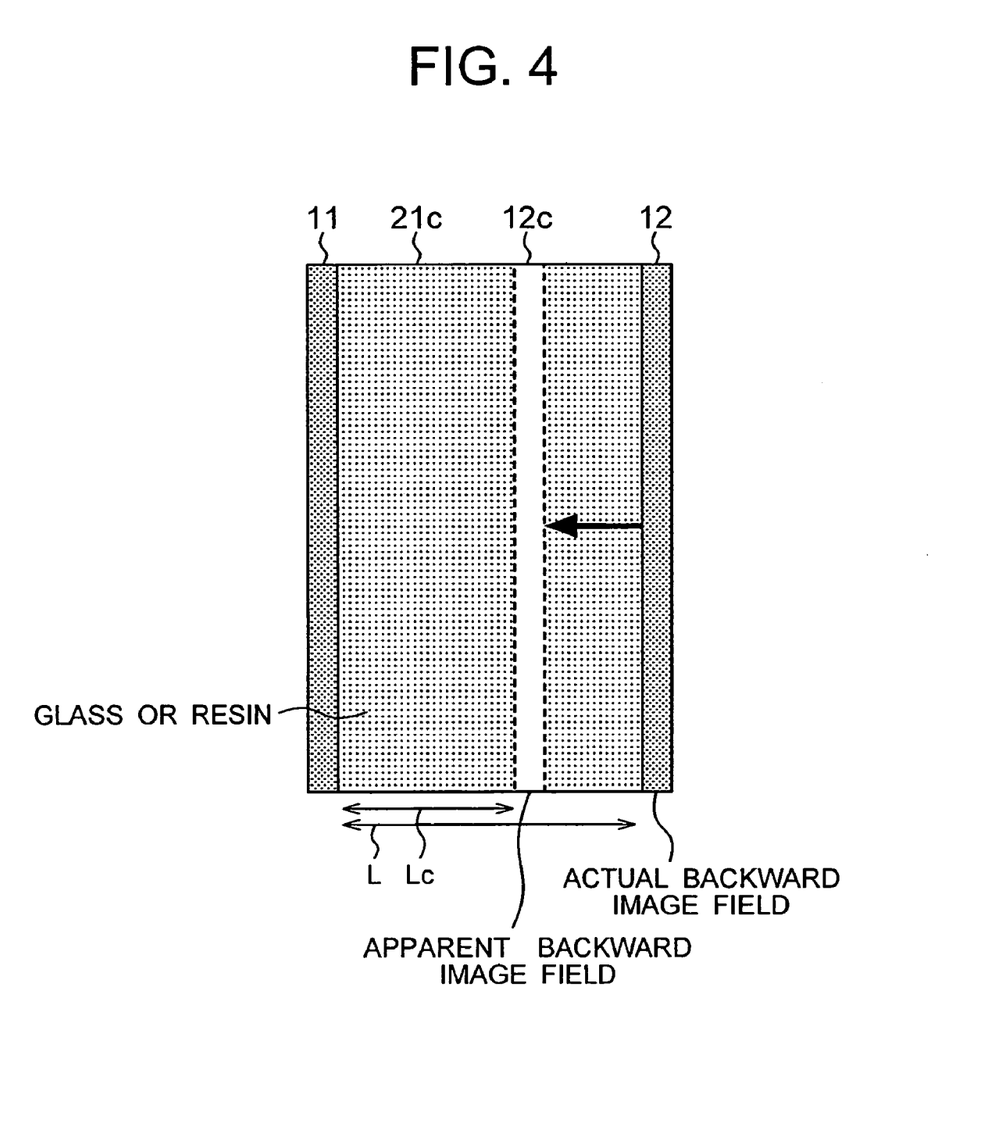
FIG. 4 is a conceptual view showing a specific example with longer optical distance between the image display portions according to the embodiment of the invention.
Figure 5:
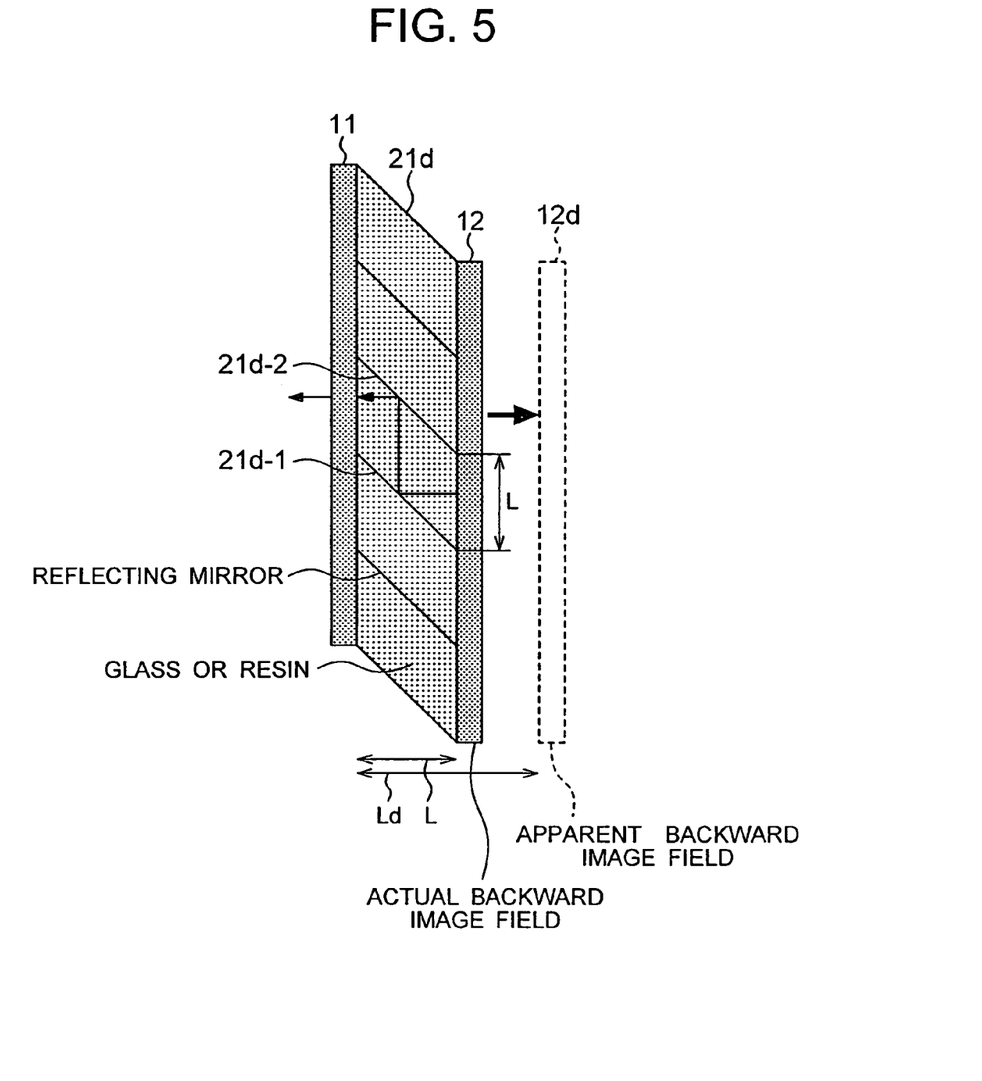
FIG. 5 is a conceptual view showing a specific example with shorter optical distance between the image display portions according to the embodiment of the invention.
Figure 6A:
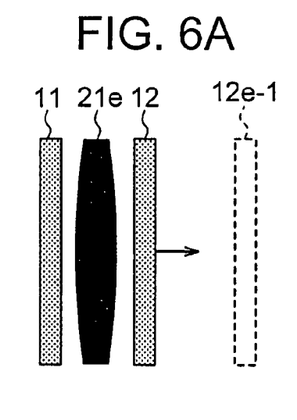
FIGS. 6A-6E are schematic cross-sectional views showing specific examples of the optical distance setting portion according to the embodiment of the invention.
Figure 6B:
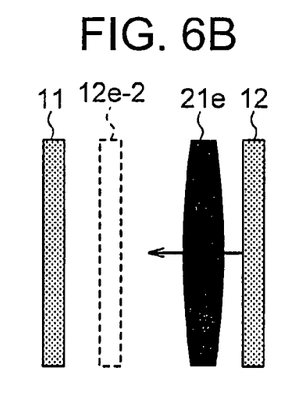
Figure 6C:
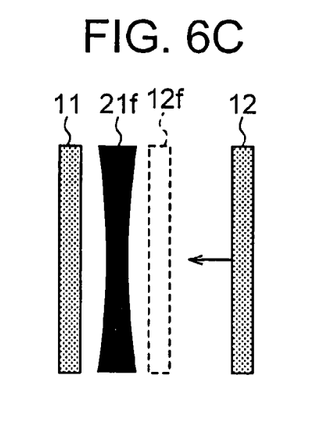
Figure 6D:
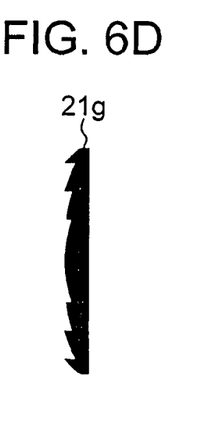
Figure 6E:
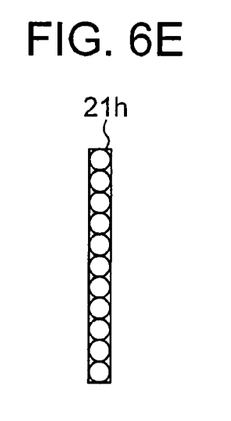
Figure 7:
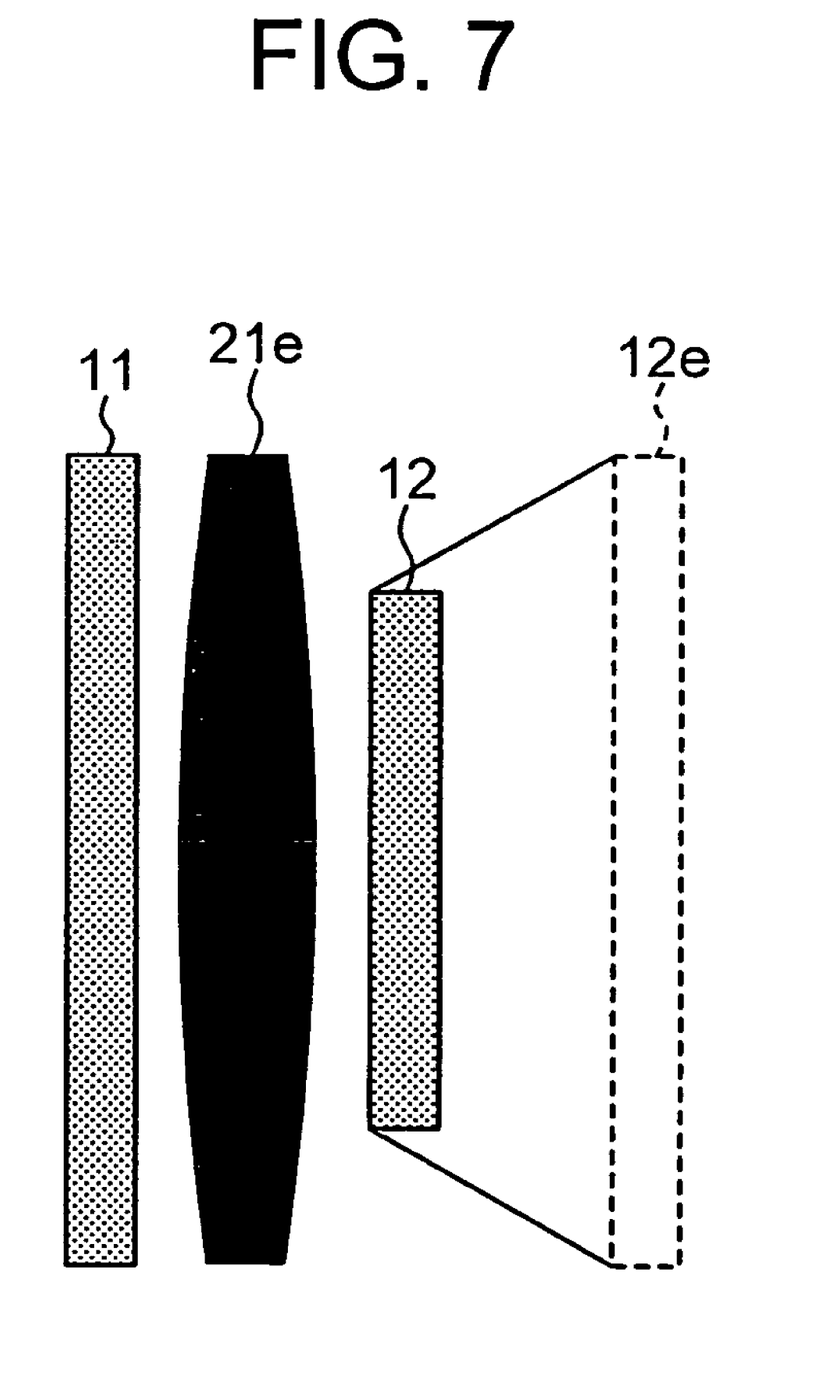
FIG. 7 is a conceptual view showing another embodiment of the image display portion when a lens is employed as the optical distance setting portion according to the embodiment of the invention.

Referring to FIGS. 4 to 7, various specific examples of the optical distance setting portion that is adopted in this embodiment will be described below. Herein, FIG. 4 is a typical view showing a cross-sectional structure of a specific example in which the optical distance setting portion employs a transparent medium having a predetermined refractive index. FIG. 5 is a typical view showing the cross-sectional structure of a specific example in which the optical distance setting portion employs a transparent medium with a reflecting mirror. FIG. 6A is a typical view showing the cross-sectional structure of a specific example in which the optical distance setting portion employs a convex lens, FIG. 6B is a typical view showing the cross-sectional structure of another specific example in which the optical distance setting portion employs the convex lens, FIG. 6C is a typical view showing the cross-sectional structure of a specific example in which the optical distance setting portion employs a concave lens, FIG. 6D is a typical view showing the cross-sectional structure of a Fresnel lens that is another specific example of the optical distance setting portion, and FIG. 6E is a typical view showing the cross-sectional structure of a micro-lens array that is another specific example of the optical distance setting portion. And FIG. 7 is a typical view showing the cross-sectional structure of the image display portion when the convex lens is employed as the optical distance setting portion.

As shown in FIG. 4, the optical distance setting portion 21c is made of at least one of glass and resin, and disposed between the front screen 11 and the back screen 12 disposed the distance L apart and in contact with both the front screen 11 and the back screen 12.

The optical distance setting portion 21c contains at least one of glass and resin, and has a greater refractive index than the air. Therefore, the optical distance (i.e., optical path length calculated in the air) when the air is filled in the portion where the optical distance setting portion 21c is disposed is shorter than the actual optical distance when the optical distance setting portion 21c is disposed. Herein, the optical path length Lc calculated in the air is represented by Lc=L/n. Accordingly, the apparent backward image field 12c is reflected at a position distance Lc apart from the front screen 11 forward of the actual position of the backward image field on the back screen 12 as seen from the side of the observer. Accordingly, the front screen 11 and the back screen 12 are substantially equivalently disposed at a shorter interval Lc than interval L1 optically or as seen from the side of the observer, although they are actually disposed with interval L.

Herein, for example, if the relative refractive index n of the optical distance setting portion 21c to the air is equal to 1.5, the optical path length calculated in the air is given by Lc=L/1.5$\cong$0.67L. That is, the apparent depth of the backward image field is 0.67 times the actual depth.

For example, in a case where the front screen 11 and the back screen 12 are actually disposed with an interval of 30 cm (i.e., L=30 cm), the apparent interval as seen from the observer (i.e., Lc) is equal to 30×0.67$\cong$20 cm. That is, the front screen 11 and the back screen 12 are actually disposed with the interval of 30 cm as seen from the side of the observer, but substantially equivalently disposed with an interval of 20 cm that is shorter than 30 cm optically or as seen from the side of the observer.

As shown in FIG. 5, the optical distance setting portion 21d disposed in contact between the front screen 11 and the back screen 12 disposed distance L apart contains glass or resin, and further comprises a plurality of (six in FIG. 5) reflecting mirrors like a window blind in the half open state inside the optical distance setting portion. The reflecting mirror reflects the image displayed on the back screen 12 to change the optical path of image in a direction that is different from the line of sight of the observer, and beyond the changed optical path, another reflecting mirror is disposed along the line of sight of the observer to change the optical path of image to cause light to proceed to the side of the observer. The optical distance setting portion 21d may have the plurality of reflecting mirrors in the air or another medium having a predetermined refractive index.

For example, an instance where the plurality of reflecting mirrors are disposed in parallel, at regular interval and at an angle of 45 degrees with respect to the line of sight of the observer as shown in FIG. 5 will be described. The image displayed on the back screen 12 has the optical path parallel to the line of sight of the observer, in which light proceeds to the side of the observer to enter one reflecting mirror 21d-1 among the plurality of reflecting mirrors at an incident angle of 45 degrees, and be reflected at a reflection angle of 45 degrees. Due to reflection by the reflecting mirror 21d-1, the optical path is changed to that perpendicular to the line of sight of the observer, and made at an angle of 45 degrees to a reflecting mirror 21d-2 adjacent to the reflecting mirror 21*d*-1. In this case, the image is reversed by the reflecting mirror 21*d*-1. The image reflected by the reflecting mirror 21*d*-1 enters the reflecting mirror 21*d*-2 at an incident angle of 45 degrees, and is reflected at an angle of 45 degrees. That is, the image reflected by the reflecting mirror 21*d*-2 has the same optical path as the image before reflection by the reflecting mirror 21*d*-1, namely, the optical path that is in parallel to the line of sight of the observer and proceeds to the side of the observer. In this case, the image is further reversed by the reflecting mirror 21*d*-2, and restored to a normal state without reversion. Thereby, the observer views the image displayed on the back screen 12 and reflected by the reflecting mirror in the same state as without being reflected by the reflecting mirror. That is, the optical path is lengthened by an optical path part between the reflecting mirror 21*d*-1 and the reflecting mirror 21*d*-2. That is, the backward image field 12*d* as seen from the side of the observer is located behind the actual position of the back screen 12.

In this case, the reflecting mirror 21*d*-1 and the reflecting mirror 21*d*-2 are disposed distance L (i.e., the same distance as the interval between the front screen 11 and the back screen 12) apart, as shown in FIG. 5. Thereby, light emitted from one pixel on the back screen 12 and light emitted from one pixel from the front screen 11 emitting light corresponding to its pixel are appropriately superposed on the line of sight of the observer. Because other reflecting mirrors are constituted in the same manner, the image for stereoscopic vision displayed on the front screen 11 and the back screen 12 are appropriately superposed and displayed on the line of sight of the observer. If the plurality of reflecting mirrors are disposed apart by the distance, which is 1/(2×k) times (k is the natural number equal to or greater than 1) the interval L between the front screen 11 and the back screen 12, the image for stereoscopic vision displayed on the front screen 11 and the back screen 12 are appropriately superposed and displayed on the line of sight of the observer.

In this case, if the reflecting mirrors are provided distance apart to the extent that the images for stereoscopic vision displayed on the front screen 11 and the back screen 12 are superposed and displayed on the line of sight of the observer, the stereoscopic image is displayed by making the optical path length longer without being limited to the above distance. The number of reflecting mirrors provided for the optical distance setting portion 21*d* is varied with the distance by which the plurality of reflecting mirrors are separated.

In this case, the optical path length is doubled due to reflection by the reflecting mirrors 21*d*-1 and 21*d*-2 as compared with the optical distance setting portion 21*d* is not disposed. On the contrary, the optical path length calculated in the air is shorter with the refractive index of glass or resin filled in the optical distance setting portion 21*d*. Therefore, the optical path length Ld calculated in the air in the optical distance setting portion 21*d* is given by Ld=L×2/1.5≅1.33L, where the interval between the front screen 11 and the back screen 12 is L and the refractive index of glass or resin is 1.5. That is, the apparent depth of the backward image field is equal to 1.33 times the actual depth.

For example, in a case where the front screen 11 and the back screen 12 are actually disposed at an interval of 30 cm (i.e., L=30 cm), the apparent interval as seen from the observer (i.e., Ld) is equal to 30×1.33≅40 cm. That is, the front screen 11 and the back screen 12 are actually disposed with the interval of 30 cm as seen from the side of the observer, but substantially equivalently disposed with an interval of 40 cm that is longer than 30 cm optically or as seen from the side of the observer. If the reflecting mirror is disposed in the air but not within the glass or resin, the optical path extended by the reflecting mirror is only considered, because it is unnecessary to consider a variation in the optical path length calculated in the air due to variation in the refractive index. That is, in the above example, the apparent depth of the backward image field is double the actual depth, and the front screen 11 and the back screen 12 are actually disposed with an interval of 30 cm apart. However, the front screen 11 and the back screen 12 are substantially equivalently disposed with an interval of 60 cm that is longer than 30 cm optically or as seen from the side of the observer.

Also, the image is reflected by the reflecting mirror and reversed. However, since the image is reflected twice, the image is not reversed and viewed by the observer. Also, the image is not reversed by the even number of reflections but not twice, when viewed by the observer. However, if the backward image field is reversed left or right, or upward or downward, by changing the signal contents in an input image signal or the drive operation in a driver circuit, the image is displayed without problem by the odd number of reflections.

When a convex lens 21*e* is employed as the optical distance setting portion 21 as shown in FIG. 6A, the image displayed on the back screen 12 has the apparent backward image field 12*e* reflected at a position decided in accordance with the focal distance of the convex lens 21*e* and the distance between the convex lens 21*e* and the back screen 12. For example, the apparent backward image field 12*e*-1 is reflected backward of the actual position of the backward image field (i.e., position of the back screen 12) as seen from the side of the observer. Accordingly, the front screen and the back screen are substantially equivalently disposed with a longer interval than the actual interval optically or as seen from the side of the observer.

Or as shown in FIG. 6B, the apparent backward image field 12*e*-2 is reflected forward of the actual position of the backward image field (i.e., position of the back screen 12) as seen from the side of the observer in accordance with the focal distance of the convex lens 21*e* and the distance between the convex lens 21*e* and the back screen 12. Accordingly, the front screen and the back screen are substantially equivalently disposed with a shorter interval than the actual interval optically or as seen from the side of the observer.

When a concave lens 21*f* is employed as the optical distance setting portion 21 as shown in FIG. 6C, the image displayed on the back screen 12 has the apparent backward image field 12*f* reflected at a position decided in accordance with the focal distance of the concave lens 21*f* and the distance between the concave lens 21*f* and the back screen 12. That is, the apparent depth of the backward image field is shorter, and the apparent backward image field 12*f* is reflected forward of the actual position of the backward image field (i.e., position of the back screen 12) as seen from the side of the observer. Accordingly, the front screen 11 and the back screen 12 are substantially equivalently disposed with a shorter interval than the actual interval optically or as seen from the side of the observer.

As shown in FIG. 6D, a Fresnel lens 21*g* may be employed as the optical distance setting portion 21. The Fresnel lens 21*g* has a smaller thickness of lens. Accordingly, the actual interval between the front screen 11 and the back screen 12 is further shortened. Thereby, when the display unit according to the embodiment of the invention is employed for the apparatus such as the portable telephone or PDA (Personal Digital Assistance) for which the reduced size is required, for example, the size is further reduced, and the thin conformation or portability is implemented.

As shown in FIG. 6E, a micro-lens array 21f may be employed as the optical distance setting portion 21. The micro-lens array 21f has a smaller thickness of lens, and is able to project at equal magnification. Therefore, the image is not formed in enlargement, unlike the convex lens. Accordingly, it is unnecessary that the front screen 11 and the back screen 12 are disposed in advance in different sizes in consideration of enlargement or reduction by the lens, as will be described later, whereby the display unit according to the embodiment of the invention is constituted, employing the front screen 11 and the back screen 12 of the equal size.

As shown in FIG. 7, the convex lens 21e is employed as the optical distance setting portion 21, and the back screen 12 smaller than the front screen 11 is disposed in advance. The observer, who views the image on the back screen 12 via the convex lens 21e, recognizes the image as the apparent backward image field 12e larger than the actual size. In the display unit according to this embodiment, the front screen 11 and the back screen 12 are disposed in advance in different sizes so that the enlarged image field (i.e., apparent backward image field 12e) on the back screen 12 may be viewed in the same size as the image field on the front screen 11 by the observer, in consideration of the enlargement of image. Specifically, the back screen 12 is disposed in smaller size than the front screen 11. Thereby, the observer views the more natural stereoscopic image.

Also, when the lens for forming the enlarged image is employed other than the convex lens, the back screen 12 is disposed in advance in smaller size than the front screen 11, considering that the image is enlarged over the actual image size.

Moreover, when the image is viewed in not only enlarged but also reduced scale by the observer, the back screen 12 is disposed in advance in larger size than the front screen 11, considering that the image is reduced below the actual size on the screen.

Furthermore, it is possible to make the adjustment for a difference in the apparent size caused by enlargement or reduction with the lens between the front and back screens, as well as the adjustment for a difference in the apparent size caused by the distance from the observer, namely, a difference in the apparent size between the front screen that appears larger due to close distance and the back screen that appears larger due to far distance.

In an alternative or additional way, the image size adjusted by the image generating portion 14 may be changed, rather than the back screen 12 being disposed in advance in larger or smaller size than the front screen 11, so that the image on the back screen 12 be displayed in larger or smaller scale than the image on the front screen 11.

It is necessary that the front screen 11 and the back screen 12 are within an appropriate range of size, whether the same or different size. That is, if the front screen 11 and the back screen 12 are within an appropriate range of size to the extent that the images on the front screen 11 and the back screen 12 are appropriately superposed, the observer views the stereoscopic image.

Though the display unit according to the embodiment of the invention has two image display portions, when the display unit has three or more image display portions, a plurality of display devices can be disposed at a desired interval as an apparent interval by repeating the operation of changing the apparent interval between two adjacent image display portions in the above manner, even though the plurality of display devices are not disposed at the desired interval due to the requirements of physical shape.

This invention is not limited to the above embodiments or examples, but may be appropriately changed without departing from the spirit or scope of the invention as read from the claims and the description. Such modified display units may also fall within the technical scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-3686 filed on Jan. 9, 2003 including the specification, claims, drawings and summary is incorporated herein by reference in its entirety.

What is claimed is:

1. A displaying method of three-dimensional images, comprising:
    a disposing process of disposing a plurality of display devices one after the other on the line of sight of the observer;
    a setting process of setting an optical distance setting device, which is disposed between two adjacent display devices among said plurality of display devices, of setting the optical distance between said two display devices to a predetermined value that is different from the optical distance when the air is filled between said two display devices; and
    an image-forming process of forming an image displayed on a display device disposed in the rear as seen from the side of the observer among said two display devices at a different position from the position of said display device disposed in the rear by an image-forming device which is disposed between two adjacent display devices among said plurality of display devices,
    wherein image-forming process forms images on each of said plurality of display devices at the same time.

2. A display unit comprising:
    a plurality of display devices disposed one after the other on the line of sight of the observer; and
    an image-forming device, which is disposed between two adjacent display devices among said plurality of display devices, for forming an image displayed on a display device disposed in the rear as seen from the side of the observer among said two display devices at a different position from the position of said display device disposed in the rear,
    wherein said plurality of display devices display images on each of said plurality of display devices at the same time.

3. The display unit according to claim 2, wherein said image-forming device comprises a lens.

4. The display unit according to claim 3, wherein said lens comprises a convex lens.

5. The display unit according to claim 3, wherein said lens comprises a concave lens.

6. The display unit according to claim 3, wherein said lens comprises a Fresnel lens.

7. The display unit according to claim 3, wherein said lens comprises a micro-lens array.

8. The display unit according to claim 3, wherein said lens corresponds to each pixel or each pixel block or pixel line composed of plural pixels in said plurality of display devices.

9. The display unit according to claim 2, wherein the screen of each of one or more display devices disposed in the rear of said image-forming device as seen from the side of the observer among said plurality of display devices and the screen of each of one or more display devices disposed in the fore of said image-forming device as seen from the side of the observer among said plurality of display devices have different sizes.

10. The display unit according to claim 9, wherein said screens have different sizes so that each pixel or each pixel block or pixel line composed of plural pixels in said plurality of display devices have the same size between said display device disposed in the rear and said display device disposed in the fore as seen from the side of the observer and be superposed.

11. The display unit according to claim 2, wherein said image-forming device is intimately contacted with at least one of said two display devices.

12. A display unit comprising:
a plurality of display devices disposed one after the other on the line of sight of the observer; and
an optical distance setting device, which is disposed between two adjacent display devices among said plurality of display devices, for setting the optical distance between said two display devices to a predetermined value that is different from the optical distance when the air is filled between said two display devices,
wherein said plurality of display devices display images on each of said plurality of display devices at the same time.

13. The display unit according to claim 1, wherein said optical distance setting device comprises a transparent member having a predetermined refractive index.

14. The display unit according to claim 13, wherein said transparent member is composed of at least one of glass and resin having a higher refractive index than the air.

15. The display unit according to claim 1, wherein said optical distance setting device comprises a reflecting member for making the optical path length between said two display devices longer than the optical path length when the air is filled by folding and lengthening the optical path between said two display devices.

16. The display unit according to claim 15, wherein said reflecting member is provided corresponding to each pixel or each pixel block or pixel line composed of plural pixels in said two display devices, in which said reflecting member folds said optical path so that the images displayed at said pixel or said pixel block or pixel line in said two display devices correspond.

17. The display unit according to claim 1, wherein said optical distance setting device is in intimate contact with at least one of said two display devices.

18. The display unit according to claim 1, wherein said display devices are translucent except for the display device farthest away from the observer among said plurality of display devices.

19. The display unit according to claim 18, wherein said translucent display device is a liquid crystal display device or EL (Electro-Luminescence) display device.

20. The display unit according to claim 1, wherein said plurality of display devices comprise a display device synthesized of a half mirror.

21. A display unit according to claim 1, further comprising:
a member having a predetermined refractive index, wherein the member is in intimate contact between two of said display devices.

22. A display unit according to claim 1, wherein said optical distance setting device comprises a reflecting member for making the optical path length between said two display devices longer than the optical path length when the air is filled by folding and lengthening the optical path between said two display devices.

* * * * *